(12) United States Patent
Shao et al.

(10) Patent No.: US 12,135,473 B2
(45) Date of Patent: Nov. 5, 2024

(54) DISPLAY DEVICE INCLUDING FIRST PERIPHERY LIGHT GUIDE REGION, SECOND PERIPHERY LIGHT GUIDE REGION, AND MIDDLE LIGHT GUIDE REGION

(71) Applicant: Qisda Corporation, Taoyuan (TW)

(72) Inventors: Chang-Min Shao, Taoyuan (TW);
Chien-Hao Kao, Taoyuan (TW);
Chih-Chun Chang, Taoyuan (TW);
Jyun-Sheng Syu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/210,129

(22) Filed: Jun. 15, 2023

(65) Prior Publication Data
US 2024/0045130 A1  Feb. 8, 2024

(30) Foreign Application Priority Data
Aug. 2, 2022  (CN) .......................... 202210921884.9

(51) Int. Cl.
*G02F 1/13* (2006.01)
*F21V 8/00* (2006.01)
*G02F 1/1335* (2006.01)

(52) U.S. Cl.
CPC ......... *G02F 1/1323* (2013.01); *G02B 6/0036* (2013.01); *G02B 6/0043* (2013.01); *G02B 6/0053* (2013.01); *G02B 6/0055* (2013.01); *G02B 6/0058* (2013.01); *G02B 6/0068* (2013.01); *G02B 6/0076* (2013.01); *G02F 1/133626* (2021.01); *G02F 1/133627* (2021.01)

(58) Field of Classification Search
CPC ... G02B 6/0036; G02B 6/0043; G02F 1/1323; G02F 1/133626; G09G 2358/00
See application file for complete search history.

(56) References Cited

U.S. PATENT DOCUMENTS

| | | | |
|---|---|---|---|
| 10,705,283 B2* | 7/2020 | Liu | G02B 6/0053 |
| 11,035,996 B2* | 6/2021 | Chang | G02B 6/0038 |
| 11,635,563 B2* | 4/2023 | Kanbayashi | G02B 6/0055 |
| | | | 362/606 |
| 2012/0235891 A1* | 9/2012 | Nishitani | G02F 1/1323 |
| | | | 345/102 |
| 2017/0153383 A1* | 6/2017 | Lee | G02B 6/0068 |
| 2021/0191027 A1* | 6/2021 | Liao | G02B 6/0053 |
| 2023/0213697 A1* | 7/2023 | Shiau | G02B 6/0036 |
| | | | 362/611 |

\* cited by examiner

*Primary Examiner* — Keith G. Delahoussaye

(57) ABSTRACT

The display device includes a display panel and a backlight module on the display panel. The backlight module includes light guide plate having a light incident surface, a light emitting surface facing the display panel and a reflection surface. Two sides of the light incident surface connect the light emitting surface and the reflection surface respectively. The reflection surface includes a first periphery light guide region, a second periphery light guide region, and a middle light guide region between the first periphery light guide region and the second periphery light guide region. The first periphery light guide region includes first microstructures. The second periphery light guide region includes second microstructures. The first microstructures have first light guide inclined surfaces inclined towards the second periphery light guide region. The second microstructures have second light guide inclined surfaces inclined towards the first periphery light guide region.

18 Claims, 9 Drawing Sheets

DISPLAY DEVICE INCLUDING FIRST PERIPHERY LIGHT GUIDE REGION, SECOND PERIPHERY LIGHT GUIDE REGION, AND MIDDLE LIGHT GUIDE REGION

This application claims the benefit of People's Republic of China application Serial No. 202210921884.9, filed Aug. 2, 2022, the subject matter of which is incorporated herein by reference.

BACKGROUND

Technical Field

The disclosure relates to a display device and more particularly to a display device including a light guide plate.

Description of the Related Art

Existing display devices usually use privacy filters (or anti-peeping filters) or collimated backlight modules to limit viewing angles. However, the use of privacy filters or collimated backlight modules may cause problems such as decreased brightness or uneven brightness of the display device. Moreover, the use of privacy filters in curved display devices may result in optical interference, which affects customer experience. Therefore, how to provide a new display device to solve above problems is the goal of those skilled in the art.

SUMMARY

According to an embodiment of the present disclosure, a display device is provided. The display device includes a display panel and a backlight module on the display panel. The backlight module includes a light guide plate and a light emitting unit. The light guide plate has a light incident surface, a light emitting surface and a reflection surface. Two sides of the light incident surface connect the light emitting surface and the reflection surface respectively. The light emitting surface faces the display panel. The reflection surface includes a first periphery light guide region, a second periphery light guide region, and a middle light guide region between the first periphery light guide region and the second periphery light guide region. The first periphery light guide region includes first microstructures. The second periphery light guide region includes second microstructures different from the first microstructures. The first microstructures have first light guide inclined surfaces inclined towards the second periphery light guide region. The second microstructures have second light guide inclined surfaces inclined towards the first periphery light guide region. The light emitting unit provides light entering the light guide plate from the light incident surface. The first light guide inclined surfaces and the second light guide inclined surfaces guide the light provided by the light emitting unit to the display panel through the light emitting surface.

According to another embodiment of the present disclosure, a display device is provided. The display device includes a display panel and a backlight module on the display panel. The backlight module includes a first light guide plate, a second light guide plate between the first light guide plate and the display panel, an optical film between the first light guide plate and the second light guide plate, a first light emitting unit, a second light emitting unit, and a control unit electrically connected to the first light emitting unit and the second light emitting unit. The second light guide plate includes diffuser dots. The first light emitting unit provides first light to the first light guide plate. The first light is converted into collimated light through the first light guide plate and the optical film. The second light emitting unit provides second light to the second light guide plate. The second light is scattered by the diffuser dots of the second light guide plate. The control unit adjusts a viewing angle of the display device by adjusting the relative intensity of the first light provided by the first light emitting unit and the second light provided by the second light emitting unit.

The above and other embodiments of the disclosure will become better understood with regard to the following detailed description of the non-limiting embodiment(s). The following description is made with reference to the accompanying drawings.

DETAILED DESCRIPTION

The illustrations may not be necessarily drawn to scale, and there may be other embodiments of the present disclosure which are not specifically illustrated. Thus, the specification and the drawings are to be regarded as an illustrative sense rather than a restrictive sense. Moreover, the descriptions disclosed in the embodiments of the disclosure such as detailed construction, manufacturing steps and material selections are for illustration only, not for limiting the scope of the disclosure. The steps and elements in details of the embodiments could be modified or changed according to the actual needs of the practical applications. The disclosure is not limited to the descriptions of the embodiments. The illustration uses the same/similar symbols to indicate the same/similar elements.

Moreover, use of ordinal terms such as "first", "second", "third", etc., in the specification and claims to modify an element or a step does not by itself imply any priority, precedence, or order of one claim element or step over another, but are used merely as labels to distinguish one claim element or step having a certain name from another element or step having the same name (but for use of the ordinal term) to distinguish the claim elements or steps.

Figure 1:
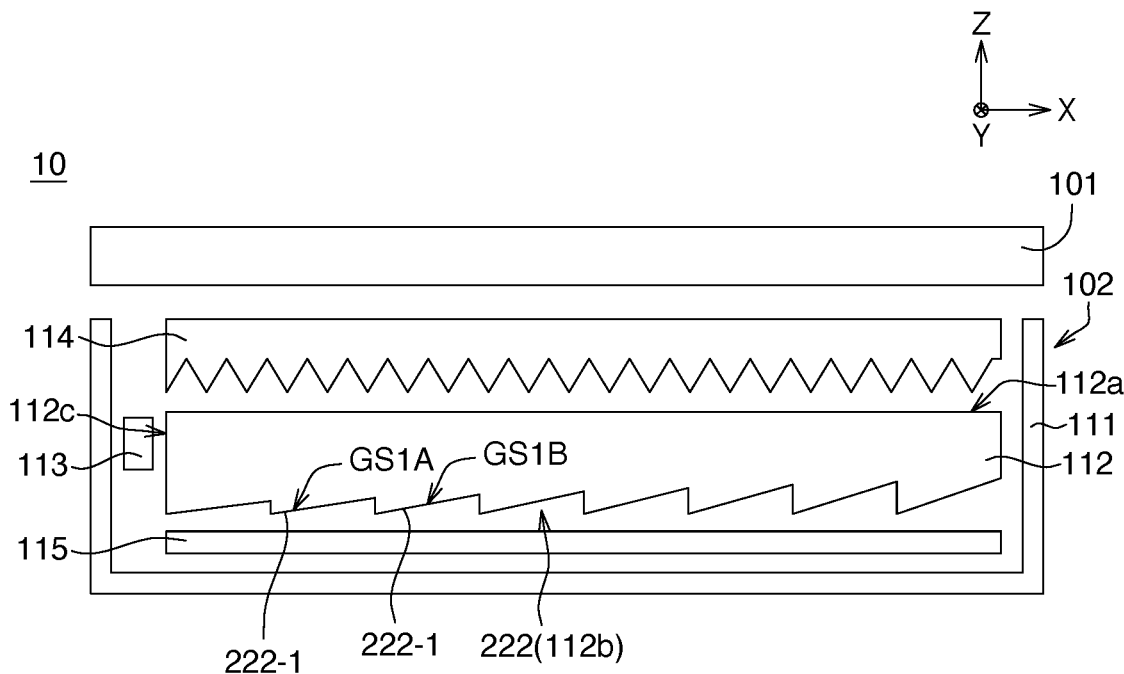
FIG. 1 shows a cross-sectional view of a display device according to an embodiment of the present disclosure.

Please refer to FIG. 1, which shows a cross-sectional view of a display device 10 according to an embodiment of the present disclosure. The display device 10 includes a display panel 101 and a backlight module 102 on the display panel 101. The display panel 101 is disposed on the light emitting side of the backlight module 102. The display panel 101 may be, for example, a liquid crystal display (LCD) panel for presentation of images. The backlight module 102 may be, for example, an edge backlight module. The backlight module 102 can be used provide light required for the display panel 101 to display images.

The backlight module 102 includes a base 111, a light guide plate 112, a light emitting unit 113, an optical film 114 and a reflective film 115. For example, the base 111 may be a housing with accommodating space. The light guide plate 112, the light emitting unit 113, the optical film 114 and the reflective film 115 can be disposed in the accommodating space. The emitting unit 113 may include light-emitting diodes (LED), micro light-emitting diodes (micro-LED) or mini light-emitting diodes (mini-LED). The emitting unit 113 may be in the form of light bar. The emitting unit 113 may be disposed along the Y direction. The light guide plate 112 has a light emitting surface 112a, a reflection surface 112b opposite to the light emitting surface 112a and a light incident surface 112c. The light emitting surface 112a faces the display panel 101. Two sides of the light incident surface 112c connect the light emitting surface 112a and the reflection surface 112b respectively. The light incident surface 112c faces the light emitting unit 113. The light provided by the light emitting unit 113 enters the light guide plate 112 from the light incident surface 112c, exits the light guide plate 112 from the light emitting surface 112a, and passes through the optical film 114 to the display panel 101. The optical film 114 may be disposed between the light guide plate 112 and the display panel 101. In an embodiment, the optical film 114 includes a reverse prism. In an embodiment, the light provided by the light emitting unit 113 is converted into collimated light through the light guide plate 112 and the optical film 114. The reflective film 115 and the optical film 114 may be disposed on opposite sides of the light guide plate 112. The light exiting from the reflection surface 112b of the light guide plate 112 can be reflected back into the light guide plate 112 by the reflective film 115, so as to increase the light use efficiency of the light guide plate 112.

Figure 2:
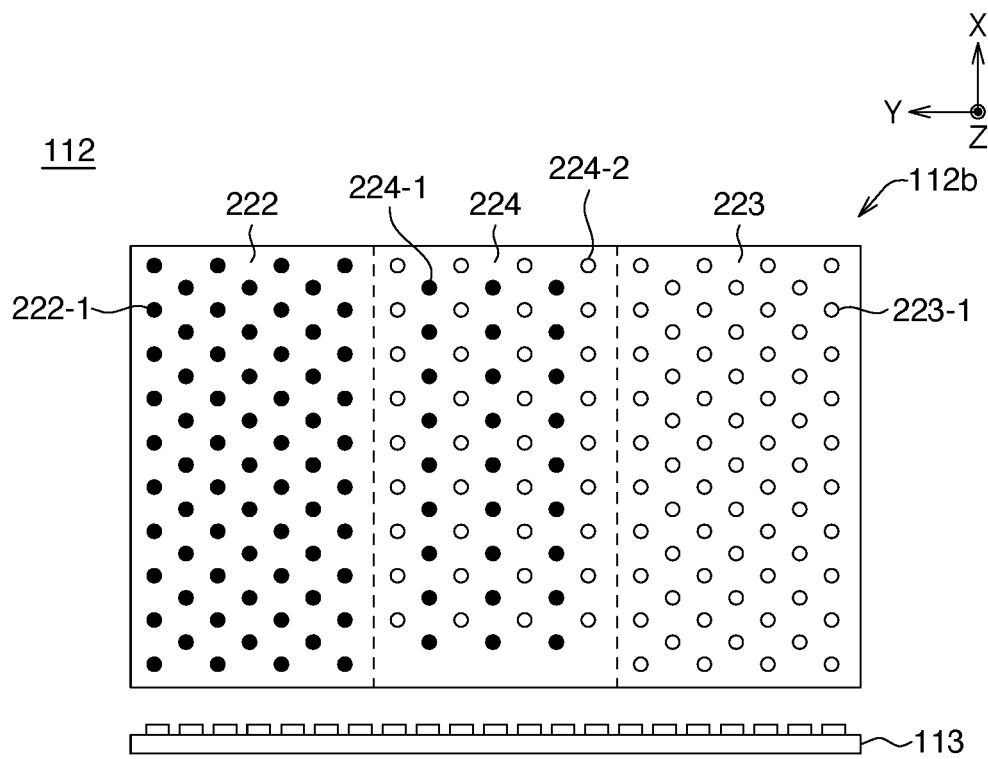
FIG. 2 shows a schematic view of a light guide plate according to an embodiment of the present disclosure.

Please refer to FIGS. 1 and 2. FIG. 2 shows a schematic view of a light guide plate 112 according to an embodiment of the present disclosure. The reflection surface 112b of the light guide plate 112 includes a first periphery light guide region 222, a second periphery light guide region 223, and a middle light guide region 224 between the first periphery light guide region 222 and the second periphery light guide region 223. The first periphery light guide region 222 connects the light incident surface 112c of the light guide plate 112.

The first periphery light guide region 222 includes first microstructures 222-1 used to change light paths. The first microstructures 222-1 may be spaced apart from each other at approximately the same interval. Alternatively, the first microstructures 222-1 may be spaced apart from each other at different intervals. Alternatively, the first microstructures 222-1 may adjoin each other. As shown in FIG. 1, the first microstructures 222-1 have first light guide inclined surfaces (e.g. a first light guide inclined surface GS1A and a first light guide inclined surface GS1B) inclined relative to a horizontal surface. The first light guide inclined surfaces are inclined towards the light emitting unit 113. The gradients of the first light guide inclined surfaces relative to the horizontal surface are different from each other. The gradient of the first light guide inclined surface of the first microstructure 222-1 closer to the light emitting unit 113 relative to the horizontal surface is smaller than the gradient of the first light guide inclined surface of the first microstructure 222-1 farther from the light emitting unit 113 relative to the horizontal surface. For example, the gradient of the first light guide inclined surface GS1A of the first microstructure 222-1 closer to the light emitting unit 113 relative to the horizontal surface is smaller than the gradient of the first light guide inclined surface GS1B of the first microstructure 222-1 farther from the light emitting unit 113 relative to the horizontal surface.

Figure 3A:
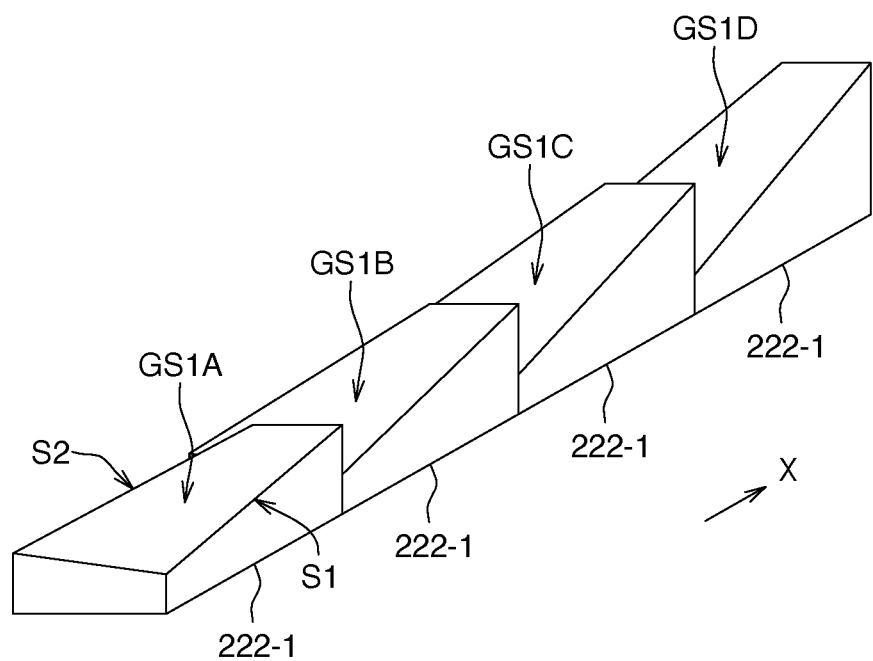
FIGS. 3A to 3D show schematic views of microstructures of a light guide plate according to embodiments of the present disclosure.

Please refer to FIG. 3A, which shows a schematic view of the first microstructures 222-1 of the light guide plate 112 according to embodiments of the present disclosure. The first microstructures 222-1 are arranged in a row of first microstructures 222-1 along the X direction, and the first periphery light guide region 222 includes a plurality of rows of first microstructures 222-1 along the Y direction. The farther the first microstructure 222-1 is from the light emitting unit 113, the greater the gradient of the first light guide inclined surface of the first microstructure 222-1 relative to the horizontal surface becomes. For example, among four first microstructures 222-1 shown in FIG. 3A, the first microstructures 222-1 having the first light guide inclined surface GS1A is closest to the light emitting unit 113, and the first microstructures 222-1 having the first light guide inclined surface GS1D is farthest away from the light emitting unit 113; the gradient of the first light guide inclined surface GS1A relative to the horizontal surface is smaller than the gradient of the first light guide inclined surface GS1B relative to the horizontal surface; the gradient of the first light guide inclined surface GS1B relative to the horizontal surface is smaller than the gradient of the first light guide inclined surface GS1C relative to the horizontal surface; the gradient of the first light guide inclined surface GS1C relative to the horizontal surface is smaller than the gradient of the first light guide inclined surface GS1D relative to the horizontal surface. The first light guide inclined surfaces GS1A~GS1D may be inclined towards the second periphery light guide region 223. The first microstructure 222-1 may have a three-dimensional structure, such as an asymmetric three-dimensional structure. The term "asymmetric three-dimensional structure" means that the first light guide inclined surface of the first microstructure 222-1 has two opposite sides with different slopes. For example, the first light guide inclined surface GS1A of the first microstructure 222-1 has a first side S1 and a second side S2 opposite to the first side S1, and the slope of the first side S1 is different from the slope of the second side S2.

Figure 3B:
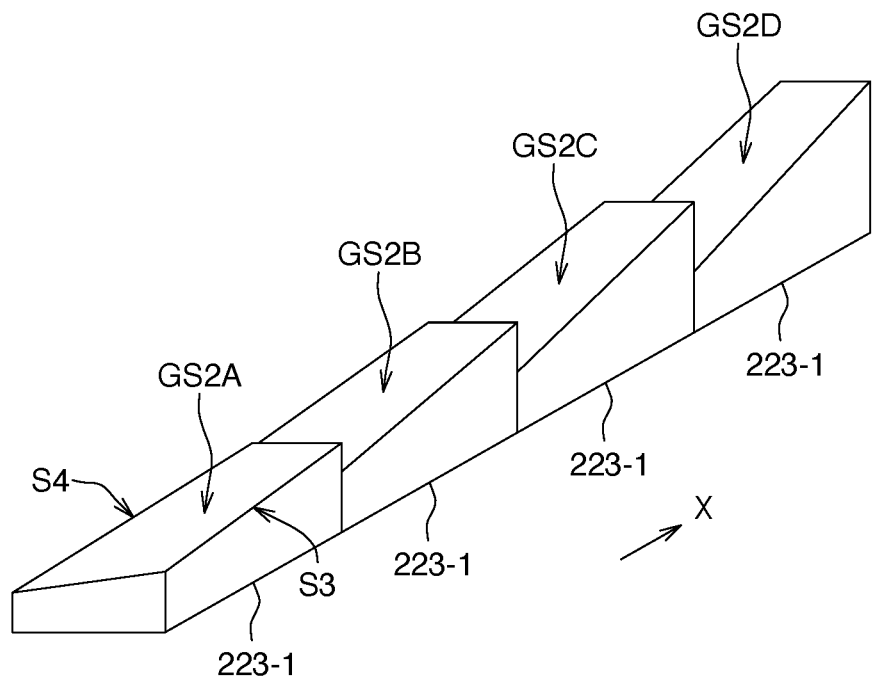

Please refer to FIGS. 2 and 3B. FIG. 3B shows a schematic view of second microstructures 223-1 of the light guide plate 112 according to embodiments of the present disclosure. The second periphery light guide region 223 includes second microstructures 223-1 used to change light paths. The first microstructures 222-1 are different from the second microstructures 223-1. The second microstructures 223-1 may be spaced apart from each other at approximately the same interval. Alternatively, the second microstructures 223-1 may be spaced apart from each other at different intervals. Alternatively, the second microstructures 223-1 may adjoin each other. The second microstructures 223-1 are arranged in a row of second microstructures 223-1 along the X direction, and the second periphery light guide region 223 includes a plurality of rows of second microstructures 223-1 along the Y direction. The second microstructures 223-1 have second light guide inclined surfaces (e.g. second light guide inclined surface GS2A~GS2D shown in FIG. 3B) inclined relative to a horizontal surface. The second light guide inclined surfaces GS2A~GS2D are inclined towards the light emitting unit 113. The second light guide inclined surfaces GS2A~GS2D are inclined towards the first periphery light guide region 222. The gradients of the second light guide inclined surfaces relative to the horizontal surface are different from each other. The gradient of the second light guide inclined surface of the second microstructure 223-1 closer to the light emitting unit 113 relative to the horizontal surface is smaller than the gradient of the second light guide inclined surface of the second microstructure 223-1 farther from the light emitting unit 113 relative to the horizontal surface. The farther the second microstructure 223-1 is from the light emitting unit 113, the greater the gradient of the second light guide inclined surface of the second microstructure 223-1 relative to the horizontal surface becomes. For example, among four second microstructures 223-1 shown in FIG. 3B, the second microstructure 223-1 having the second light guide inclined surface GS2A is closest to the light emitting unit 113, and the second microstructure 223-1 having the second light guide inclined surface GS2D is farthest away from the light emitting unit 113; the gradient of the second light guide inclined surface GS2A relative to the horizontal surface is smaller than the gradient of the second light guide inclined surface GS2B relative to the horizontal surface; the gradient of the second light guide inclined surface GS2B relative to the horizontal surface is smaller than the gradient of the second light guide inclined surface GS2C relative to the horizontal surface; the gradient of the second light guide inclined surface GS2C relative to the horizontal surface is smaller than the gradient of the second light guide inclined surface GS2D relative to the horizontal surface. The second microstructure 223-1 may have a three-dimensional structure, such as an asymmetric three-dimensional structure. The term "asymmetric three-dimensional structure" means that the second light guide inclined surface of the second microstructure 223-1 has two opposite sides with different slopes. For example, the second light guide inclined surface GS2A of the second microstructure 223-1 has a first side S3 and a second side S4 opposite to the first side S3, and the slope of the first side S3 is different from the slope of the second side S4.

Figure 3C:
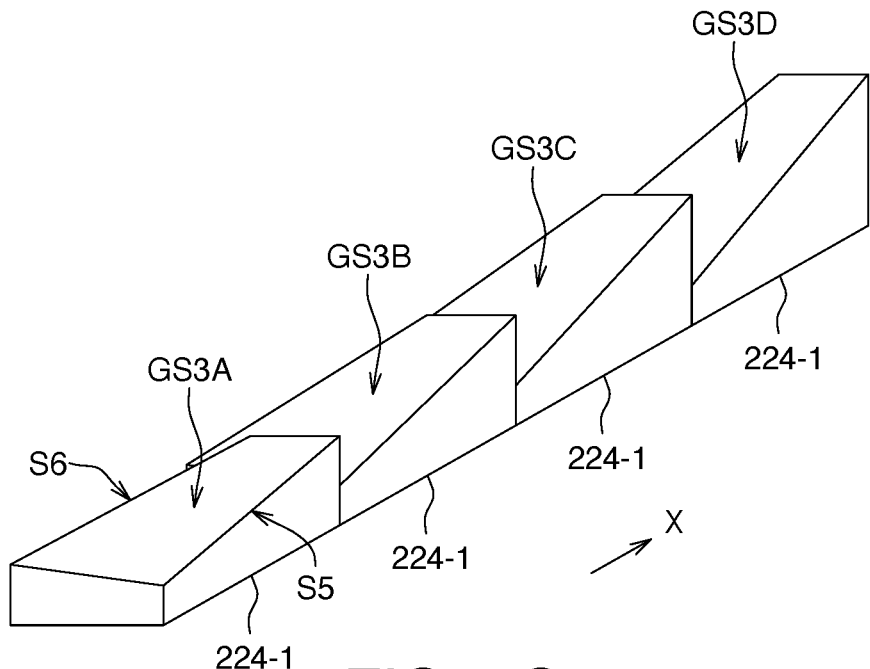
Figure 3D:
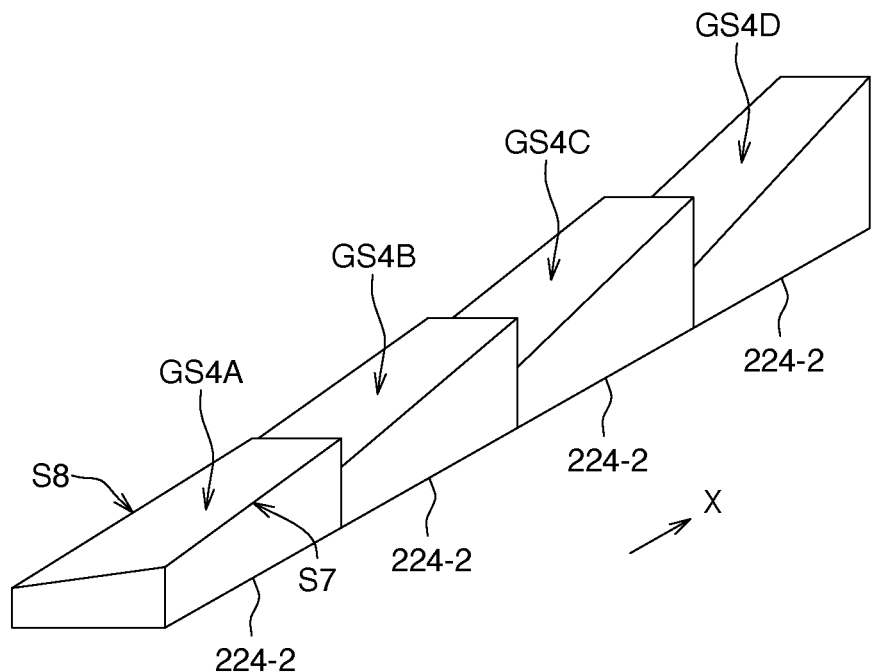

Please refer to FIGS. 2, 3C and 3D. FIG. 3C shows a schematic view of third microstructures 224-1 of the light guide plate 112 according to embodiments of the present disclosure. FIG. 3D shows a schematic view of fourth microstructures 224-2 of the light guide plate 112 according to embodiments of the present disclosure. The middle light guide region 224 includes third microstructures 224-1 and fourth microstructures 224-2 used to change light paths. The third microstructures 224-1 are different from the fourth microstructures 224-2. The third microstructures 224-1 and fourth microstructures 224-2 may be spaced apart from each other at approximately the same interval. Alternatively, the third microstructures 224-1 and fourth microstructures 224-2 may be spaced apart from each other at different intervals. Alternatively, the third microstructures 224-1 and fourth microstructures 224-2 may adjoin each other. The third microstructures 224-1 are arranged in a row of third microstructures 224-1 along the X direction. The fourth microstructures 224-2 are arranged in a row of fourth microstructures 224-2 along the X direction. The middle light guide region 224 includes one or more rows of third microstructures 224-1 and/or one or more rows of fourth microstructures 224-2 along the Y direction. One or more rows of third microstructures 224-1 and one or more rows of fourth microstructures 224-2 may be arranged alternately along the Y direction. Alternatively, one or more rows of third microstructures 224-1 may be arranged in an area of the middle light guide region 224, and one or more rows of fourth microstructures 224-2 may be arranged in another area of the middle light guide region 224. For example, as shown in FIG. 2, rows of third microstructures 224-1 and rows of fourth microstructures 224-2 may be arranged alternately along the Y direction. In another embodiment, the middle light guide region 224 may include one or more third microstructures 224-1 and one or more fourth microstructures 224-2 arranged along the X direction.

The third microstructures 224-1 have third light guide inclined surfaces (e.g. third light guide inclined surface GS3A~GS3D shown in FIG. 3C) inclined relative to a horizontal surface. The third light guide inclined surface GS3A~GS3D are inclined towards the light emitting unit 113. The third light guide inclined surface GS3A~GS3D are inclined towards the second periphery light guide region 223. The gradients of the third light guide inclined surfaces relative to the horizontal surface are different from each other. The gradient of the third light guide inclined surface of the third microstructure 224-1 closer to the light emitting unit 113 relative to the horizontal surface is smaller than the gradient of the third light guide inclined surface of the third microstructure 224-1 farther from the light emitting unit 113 relative to the horizontal surface. The farther the third microstructure 224-1 is from the light emitting unit 113, the greater the gradient of the third light guide inclined surface of the third microstructure 224-1 relative to the horizontal surface becomes. For example, among four third microstructures 224-1 shown in FIG. 3C, the third microstructure 224-1 having the third light guide inclined surface GS3A is closest to the light emitting unit 113, and the third microstructure 224-1 having the third light guide inclined surface GS3D is farthest away from the light emitting unit 113; the gradient of the third light guide inclined surface GS3A relative to the horizontal surface is smaller than the gradient of the third light guide inclined surface GS3B relative to the horizontal surface; the gradient of the third light guide inclined surface GS3B relative to the horizontal surface is smaller than the gradient of the third light guide inclined surface GS3C relative to the horizontal surface; the gradient of the third light guide inclined surface GS3C relative to the horizontal surface is smaller than the gradient of the third light guide inclined surface GS3D relative to the horizontal surface. The third microstructure 224-1 may have a three-dimensional structure, such as an asymmetric three-dimensional structure. The term "asymmetric three-dimensional structure" means that the third light guide inclined surface of the third microstructure 224-1 has two opposite sides with different slopes. For example, the third light guide inclined surface GS3A of the third microstructure 224-1 has a first side S5 and a second side S6 opposite to the first side S5, and the slope of the first side S5 is different from the slope of the second side S6.

The fourth microstructures 224-2 have fourth light guide inclined surfaces (e.g. fourth light guide inclined surface GS4A~GS4D shown in FIG. 3D) inclined relative to a horizontal surface. The fourth light guide inclined surface GS4A~GS4D are inclined towards the light emitting unit 113. The fourth light guide inclined surface GS4A~GS4D are inclined towards the first periphery light guide region 222. The gradients of the fourth light guide inclined surfaces relative to the horizontal surface are different from each other. The gradient of the fourth light guide inclined surface of the fourth microstructure 224-2 closer to the light emitting unit 113 relative to the horizontal surface is smaller than the gradient of the fourth light guide inclined surface of the fourth microstructure 224-2 farther from the light emitting unit 113 relative to the horizontal surface. The farther the fourth microstructure 224-2 is from the light emitting unit 113, the greater the gradient of the fourth light guide inclined surface of the fourth microstructure 224-2 relative to the horizontal surface becomes. For example, among four fourth microstructures 224-2 shown in FIG. 3D, the fourth microstructure 224-2 having the fourth light guide inclined surface GS4A is closest to the light emitting unit 113, and the fourth microstructure 224-2 having the fourth light guide inclined surface GS4D is farthest away from the light emitting unit 113; the gradient of the fourth light guide inclined surface GS4A relative to the horizontal surface is smaller than the gradient of the fourth light guide inclined surface GS4B relative to the horizontal surface; the gradient of the fourth light guide inclined surface GS4B relative to the horizontal surface is smaller than the gradient of the fourth light guide inclined surface GS4C relative to the horizontal surface; the gradient of the fourth light guide inclined surface GS4C relative to the horizontal surface is smaller than the gradient of the fourth light guide inclined surface GS4D relative to the horizontal surface. The fourth microstructure 224-2 may have a three-dimensional structure, such as an asymmetric three-dimensional structure. The term "asymmetric three-dimensional structure" means that the fourth light guide inclined surface of the fourth microstructure 224-2 has two opposite sides with different slopes. For example, the fourth light guide inclined surface GS4A of the fourth microstructure 224-2 has a first side S7 and a second side S8 opposite to the first side S7, and the slope of the first side S7 is different from the slope of the second side S8.

The first light guide inclined surface of the first microstructure 222-1, the second light guide inclined surface of the second microstructure 223-1, the third light guide inclined surface of the third microstructure 224-1 and the fourth light guide inclined surface of the fourth microstructure 224-2 guide (e.g. reflect) the light from the light emitting unit 113, so that the light travels from the light emitting surface 112a of the light guide plate 112 to the display panel 101. In an embodiment, since the gradient of the first light guide inclined surface of the first microstructure 222-1 increases along the direction away from the light emitting element 113, the gradient of the second light guide inclined surface of the second microstructure 223-1 increases along the direction away from the light emitting element 113, the gradient of the third light guide inclined surface of the third microstructure 224-1 increases along the direction away from the light emitting element 113, and the gradient of the fourth light guide inclined surface of the fourth microstructure 224-2 increases along the direction away from the light emitting element 113, the periphery light traveling to the periphery of the light guide plate 112 can be guided (e.g. reflected) to the light emitting surface 112a of the light guide plate 112, thereby reducing light loss and improving the brightness of the periphery of the display panel 101. In an embodiment, the first light guide inclined surface of the first microstructure 222-1 and the second light guide inclined surface of the second microstructure 223-1 can guide the light from the light emitting element 113 towards the middle light guide region 224.

Figure 4:
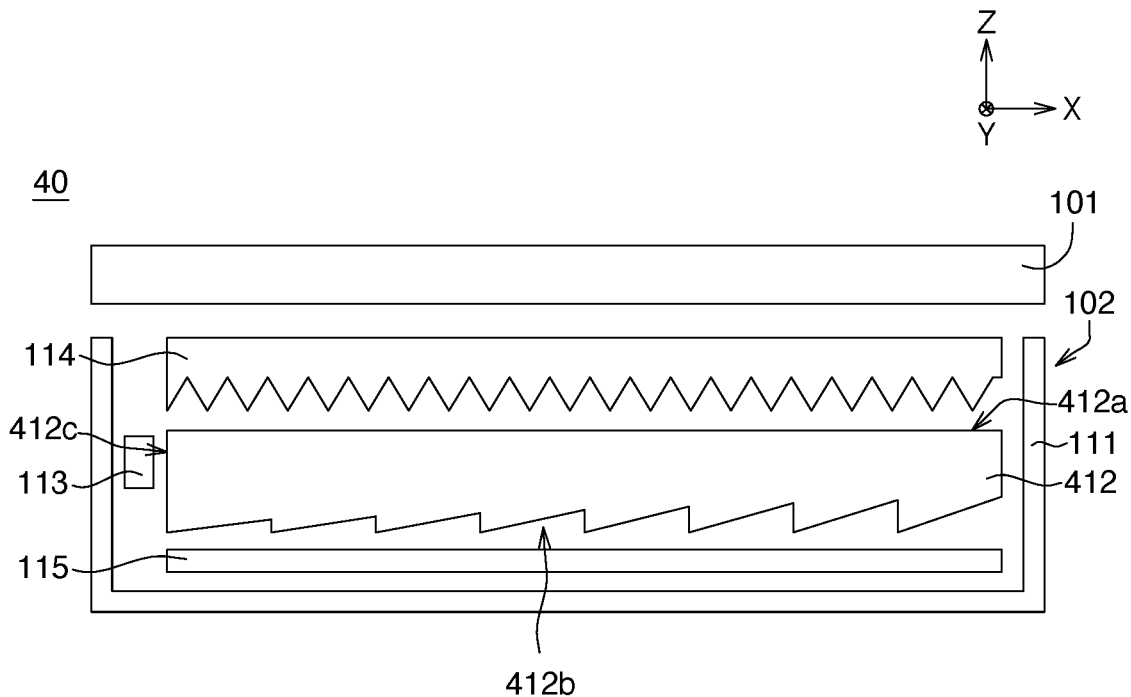
FIG. 4 shows a cross-sectional view of a display device according to an embodiment of the present disclosure.

Please refer to FIG. 4, which shows a cross-sectional view of a display device 40 according to an embodiment of the present disclosure. The difference between the display device 40 and the display device 10 is that the light guide plate 412 of the backlight module 402 of the display device 40 is different from the light guide plate 112 of the backlight module 102 of the display device 10.

The display device 40 includes a display panel 101 and a backlight module 402 on the display panel 101. The display panel 101 is disposed on the light emitting side of the backlight module 402. The light guide plate 412 of the backlight module 402 has a light emitting surface 412a, a reflection surface 412b opposite to the light emitting surface 412a and a light incident surface 412c. The light emitting surface 412a faces the display panel 101. Two sides of the light incident surface 412c connect the light emitting surface 412a and the reflection surface 412b respectively. The light incident surface 412c faces the light emitting unit 113. The light provided by the light emitting unit 113 enters the light guide plate 412 from the light incident surface 412c, exits the light guide plate 412 from the light emitting surface 412a, and passes through the optical film 114 to the display panel 101.

Figure 5:
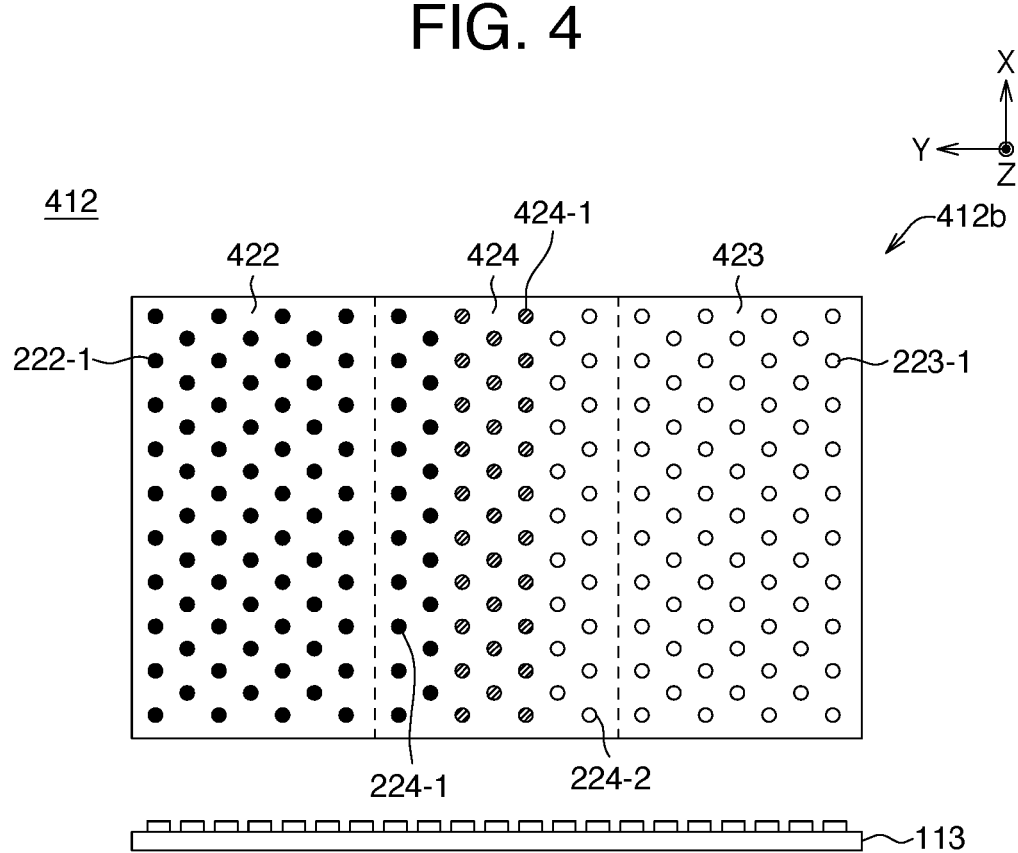
FIG. 5 shows a schematic view of a light guide plate according to an embodiment of the present disclosure.

Please refer to FIGS. 4 and 5. FIG. 5 shows a schematic view of the light guide plate 412 according to an embodiment of the present disclosure. The reflection surface 412b of the light guide plate 412 includes a first periphery light guide region 422, a second periphery light guide region 423, and a middle light guide region 424 between the first periphery light guide region 422 and the second periphery light guide region 423. The first periphery light guide region 422 includes the first microstructures 222-1 as shown in FIG. 3A. The second periphery light guide region 423 includes the second microstructures 223-1 as shown in FIG. 3B. The middle light guide region 424 includes the third microstructures 224-1 as shown in FIG. 3C, the fourth microstructures 224-2 as shown in FIG. 3D, and fifth microstructures 424-1. The fifth microstructures 424-1 are different from the first microstructures 222-1, the first microstructures 222-1, the third microstructures 224-1 and the fourth microstructures 224-2. The fifth microstructures 424-1 can be used to change light paths. The third microstructures 224-1, the fourth microstructures 224-2 and the fifth microstructures 424-1 may be spaced apart from each other at approximately the same interval. Alternatively, the third microstructures 224-1, the fourth microstructures 224-2 and the fifth microstructures 424-1 may be spaced apart from each other at different intervals. Alternatively, the third microstructures 224-1, the fourth microstructures 224-2 and the fifth microstructures 424-1 may adjoin each other. In another embodiment, the middle light guide region 424 includes one type of the third microstructures 224-1 and the fourth microstructures 224-2, and further includes the fifth microstructures 424-1. As shown in FIG. 5, the third microstructures 224-1 are arranged in a row of third microstructures 224-1 along the X direction. The fourth microstructures 224-2 are arranged in a row of fourth microstructures 224-2 along the X direction. The fifth microstructures 424-1 rearranged in a row of fifth microstructures 424-1 along the X direction. The middle light guide region 424 may include one or more rows of third microstructures 224-1, one or more rows of fourth microstructures 224-2 and one or more rows of fifth microstructures 424-1 arranged along the Y direction. One or more rows of third microstructures 224-1, one or more rows of fourth microstructures 224-2 and one or more rows of fifth microstructures 424-1 may be arranged alternately along the Y direction. Alternatively, one or more rows of third microstructures 224-1 may be arranged in an area of the middle light guide region 424, one or more rows of fourth microstructures 224-2 may be arranged in another area of the middle light guide region 424, and one or more rows of fifth microstructures 424-1 may be arranged in yet another area of the middle light guide region 424. In another embodiment, the middle light guide region 424 may include one or more third microstructures 224-1, one or more fourth microstructures 224-2 and one or more fifth microstructures 424-1 arranged along the X direction.

Figure 6:
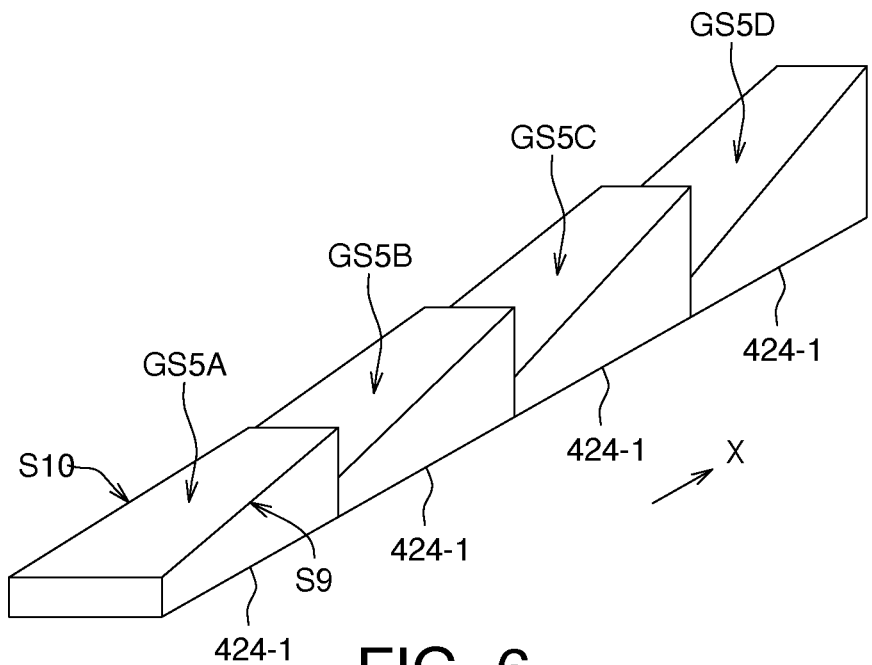
FIG. 6 shows a schematic view of microstructures of a light guide plate according to an embodiment of the present disclosure.

Please refer to FIGS. 5 and 6. FIG. 6 shows a schematic view of the fifth microstructures 424-1 of the light guide plate 412 according to embodiments of the present disclosure. The fifth microstructures 424-1 have fifth light guide inclined surfaces (e.g. fifth light guide inclined surface GS5A~GS5D shown in FIG. 6) inclined relative to a horizontal surface. The fifth light guide inclined surface GS5A~GS5D are inclined towards the light emitting unit 113. The gradients of the fifth light guide inclined surfaces relative to the horizontal surface are different from each other. The gradient of the fifth light guide inclined surface of the fifth microstructure 424-1 closer to the light emitting unit 113 relative to the horizontal surface is smaller than the gradient of the fifth light guide inclined surface of the fifth microstructure 424-1 farther from the light emitting unit 113 relative to the horizontal surface. The farther the fifth microstructure 424-1 is from the light emitting unit 113, the greater the gradient of the fifth light guide inclined surface of the fifth microstructure 424-1 relative to the horizontal surface becomes. For example, among four fifth microstructures 424-1 shown in FIG. 6, the fifth microstructure 424-1 having the fifth light guide inclined surface GS5A is closest to the light emitting unit 113, and the fifth microstructure 424-1 having the fifth light guide inclined surface GS5D is farthest away from the light emitting unit 113; the gradient of the fifth light guide inclined surface GS5A relative to the horizontal surface is smaller than the gradient of the fifth light guide inclined surface GS5B relative to the horizontal surface; the gradient of the fifth light guide inclined surface GS5B relative to the horizontal surface is smaller than the gradient of the fifth light guide inclined surface GS5C relative to the horizontal surface; the gradient of the fifth light guide inclined surface GS5C relative to the horizontal surface is smaller than the gradient of the fifth light guide inclined surface GS5D relative to the horizontal surface. The fifth microstructure 424-1 may have a three-dimensional structure, such as a symmetrical three-dimensional structure. The term "symmetrical three-dimensional structure" means that the fifth light guide inclined surface of the fifth microstructure 424-1 has two opposite sides, and the slopes of the two sides are the same. For example, the fifth light guide inclined surface GS5A of the fifth microstructure 424-1 has a first side S9 and a second side S10 opposite to the first side S9, and the slopes of the first side S7 and the second side S8 are the same. In an embodiment, since the gradient of the fifth light guide inclined surface of the fifth microstructure 424-1 increases along the direction away from the light emitting element 113, the light traveling to the periphery of the light guide plate 412 can be guided (e.g. reflected) to the light emitting surface 412a of the light guide plate 412, thereby reducing light loss and improving the brightness of the periphery of the display panel 101.

In the display devices 10 and 40, with the arrangement of microstructures in the light guide plate 112/412, the brightness of the periphery of the display panel 101 increases without affecting the anti-peeping effect. Therefore, the problem that the images in the periphery of the display panel 101 is difficult to watch caused by insufficient brightness of the periphery of the display panel 101 can be avoided.

Figure 7:
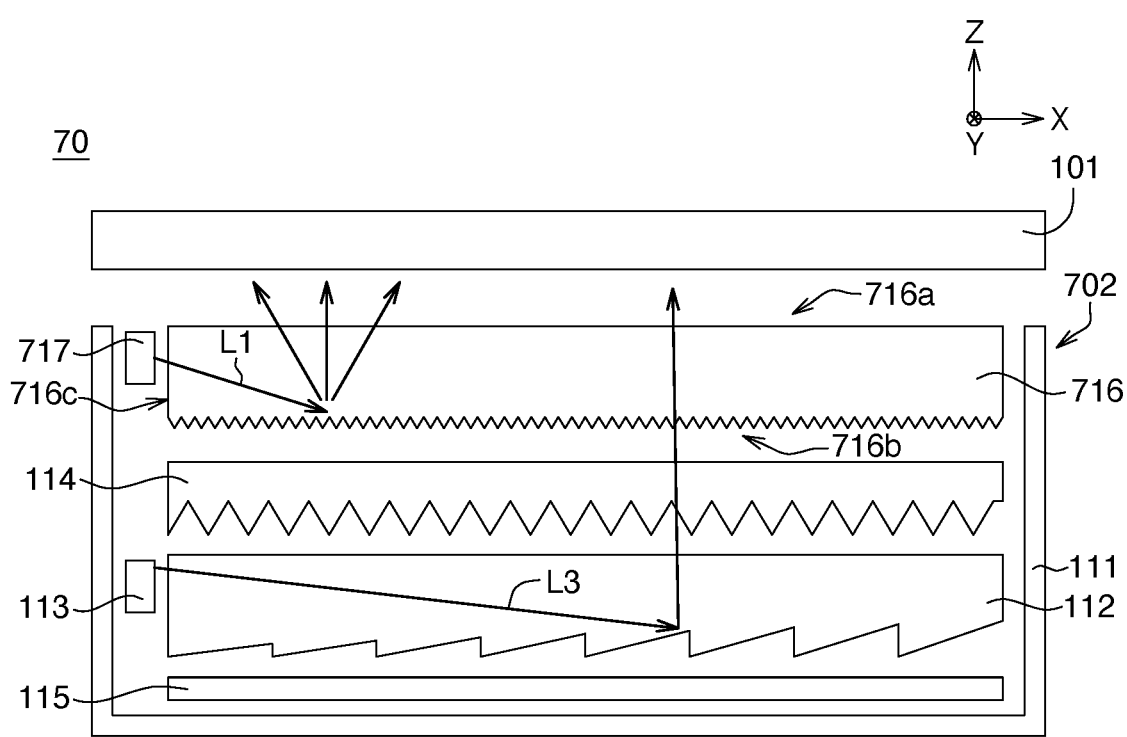
FIG. 7 shows a cross-sectional view of a display device according to an embodiment of the present disclosure.
Figure 8:
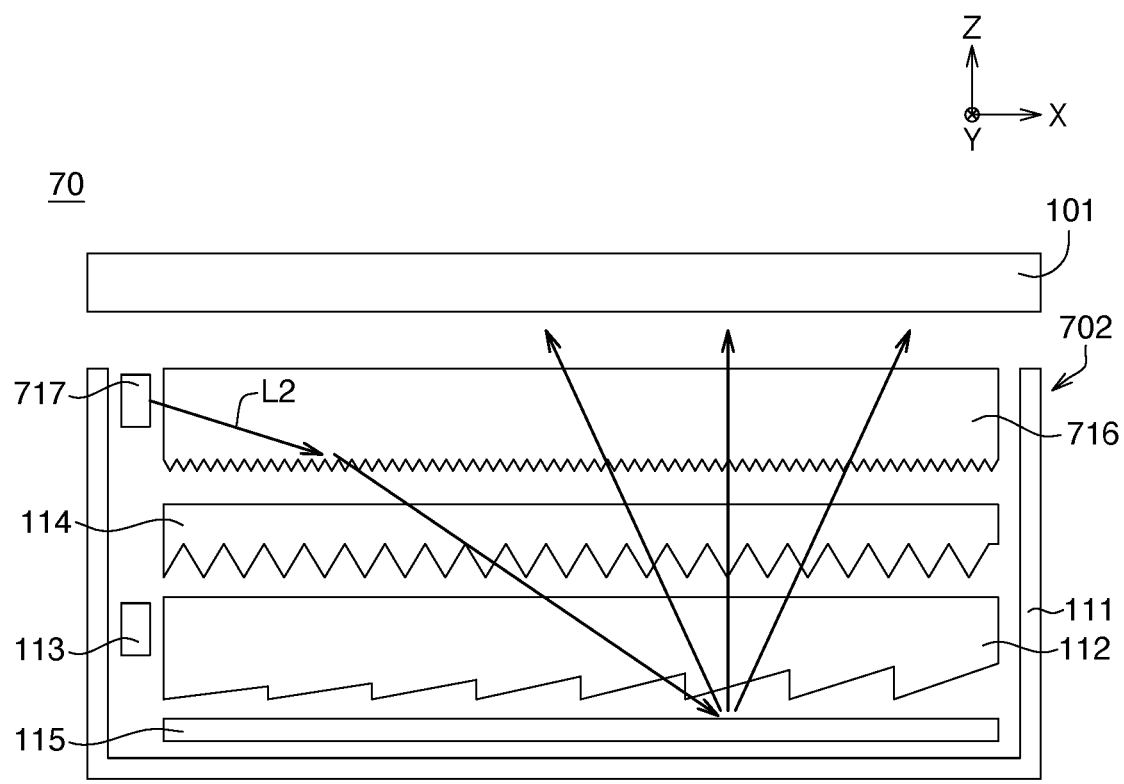
FIG. 8 shows a cross-sectional view of a display device according to an embodiment of the present disclosure.

Please refer to FIGS. 7 and 8, which show cross-sectional views of a display device 70 according to an embodiment of the present disclosure. FIGS. 7 and 8 show different light paths. The difference between the display device and the display device 10 is that the backlight module 702 of the display device 70 further includes a light guide plate 716 between the display panel 101 and the light guide plate 112 and a light emitting unit 717.

The display device 70 includes a display panel 101 and a backlight module 702 on the display panel 101. The display panel 101 is disposed on the light emitting side of the backlight module 702. The backlight module 702 can be used provide light required for the display panel 101 to display images. The backlight module 702 includes a base 111, a light guide plate 112, a light emitting unit 113, an optical film 114, a reflective film 115, a light guide plate 716 and a light emitting unit 717. For example, the base 111 may be a housing with accommodating space. The light guide plate 112, the light emitting unit 113, the optical film 114, the reflective film 115, the light guide plate 716 and the light emitting unit 717 can be disposed in the accommodating space. In another embodiment, the light guide plate 112 in the display device 70 can be replaced with the light guide plate 412 shown in FIGS. 4 and 5. The optical film 114 is disposed between the light guide plate 112 and the light guide plate 716. The light guide plate 716 has a light emitting surface 716a, a reflection surface 716b opposite to the light emitting surface 716a and a light incident surface 716c. The light emitting surface 716a faces the display panel 101. Two sides of the light incident surface 716c connect the light emitting surface 716a and the reflection surface 716b respectively. The light incident surface 716c faces the light emitting unit 717. The light guide plate 716 may be made of a single material, or may include composite materials. The emitting unit 717 may include light-emitting diodes (LED), micro light-emitting diodes (micro-LED) or mini light-emitting diodes (mini-LED). The emitting unit 717 may be in the form of light bar.

Figure 9:
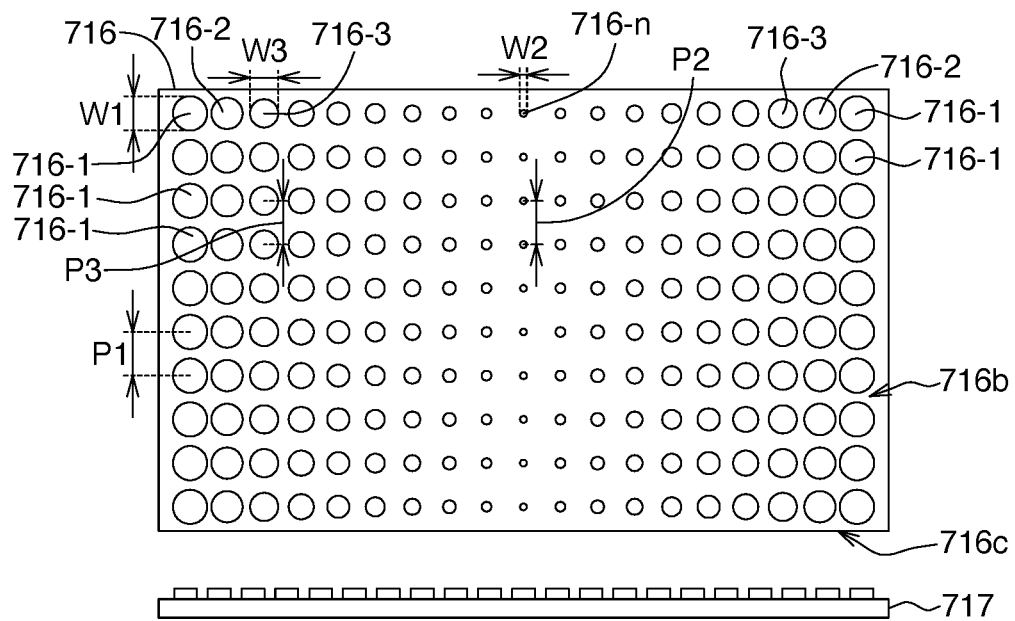
FIG. 9 shows a schematic view of a light guide plate according to an embodiment of the present disclosure.

Please refer to FIG. 9, which shows a schematic view of the light guide plate 716 according to an embodiment of the present disclosure. The reflection surface 716b of the light guide plate 716 includes diffuser dots 716-1, diffuser dots 716-2, diffuser dots 716-3 . . . and diffuser dots 716-n. The light is scattered by the diffuser dots 716-1~716-n when the light from the light emitting unit 717 reaches the reflection surface 716b of the light guide plate 716. In this embodiment, the diffuser dots 716-1 are arranged in periphery of the light guide plate 716 and the diffuser dots 716-n are arranged in middle of the light guide plate 716. The diffuser dots 716-1 are arranged on opposite sides of the diffuser dots 716-n. The diffuser dots 716-2 are arranged on opposite sides of the diffuser dots 716-n. The diffuser dots 716-3 are arranged between the diffuser dots 716-1 and the diffuser dots 716-n. The diffuser dots 716-1~716-n may have different sizes (e.g. widths). In this embodiment, as compared with the diffusion dots arranged in middle of the light guide plate 716, the diffusion dots near the edge of the light guide plate 716 may have larger widths. For example, the diffuser dot 716-1 has a width W1, the diffuser dot 716-n has a width W2, the diffuser dot 716-3 has a width W3. The width W1 is greater than the width W2. The width W3 is greater than the width W2 and smaller than the width W1.

The diffuser dots 716-1~716-n may be spaced apart from each other at a fixed pitch. For example, the diffuser dots 716-1 have a pitch P1, the diffuser dots 716-n have a pitch P2, and the diffuser dots 716-3 have a pitch P3. The pitch P1 is equal to the pitch P2. The pitch 2 is equal to the pitch P3. In an embodiment, the pitch means a distance between centers of the diffuser dots.

Figure 10:
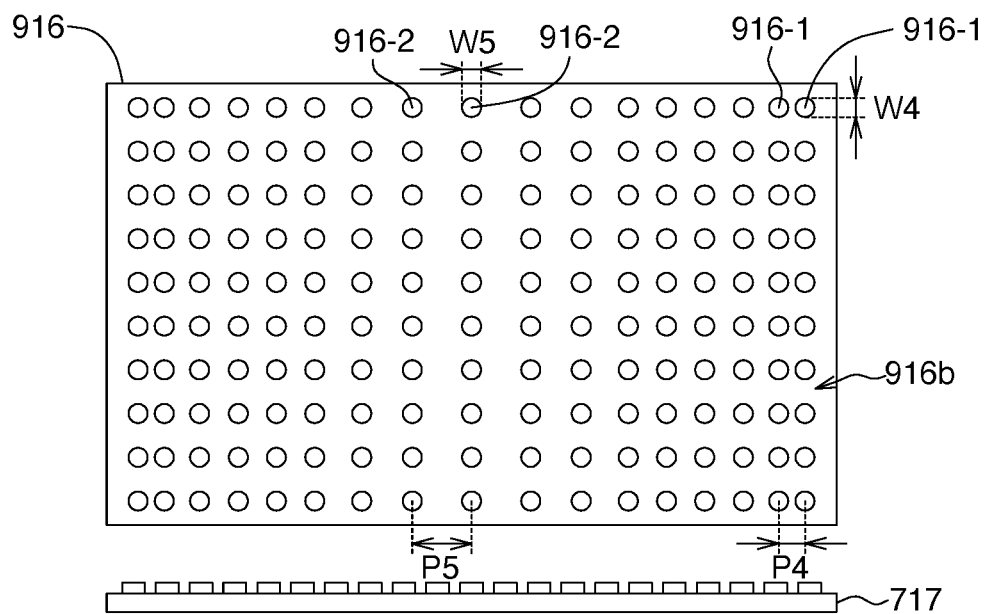
FIG. 10 shows a schematic view of a light guide plate according to an embodiment of the present disclosure.

Please refer to FIG. 10, which shows a schematic view of a light guide plate 916 according to an embodiment of the present disclosure. The differences between the light guide plate 916 and the light guide plate 716 shown in FIG. 9 are explained as follows. The reflection surface 916b of the light guide plate 916 includes diffuser dots 916-1 and 916-2. The light is scattered by the diffuser dots 916-1 and 916-2 when the light from the light emitting unit 717 reaches the reflection surface 916b of the light guide plate 916. In this embodiment, the diffuser dots 916-1 are arranged in periphery of the light guide plate 916 and the diffuser dots 916-2 are arranged in middle of the light guide plate 916. The diffuser dots 916-1 and 916-2 may have the same size (e.g. width). For example, the diffuser dot 916-1 has a width W4, the diffuser dot 916-2 has a width W5. The width W4 is equal to the width W5.

The diffuser dots 916-1 and 916-2 may be spaced apart from each other at different pitches. In this embodiment, as compared with the diffusion dots arranged in middle of the light guide plate 916, the diffusion dots near the edge of the light guide plate 916 may have smaller pitches. For example, the diffuser dots 916-1 have a pitch P4, and the diffuser dots 916-2 have a pitch P5. The pitch P4 is smaller than the pitch P5. In an embodiment, as compared with the diffusion dots arranged in middle of the light guide plate 916, the distribution density of the diffusion dots near the edge of the light guide plate 916 is higher. In another embodiment, the diffuser dots of the light guide plate can be different from the types shown in FIGS. 9-10. For example, the diffuser dots may have other shapes, sizes and/or arrangements. The present disclosure is not limited thereto. The diffuser dots of the light guide plates 716 and 916 can increase the degree of light scattering in periphery of the light guide plate.

Please refer to FIGS. 7-8. In an embodiment, the light L1 provided by the light emitting unit 717 enters the light guide plate 716 from the light incident surface 716c, the light travels to the reflection surface 716b, the light is scattered by the diffuser dots of the reflection surface 716b, and then the light travels to the display panel 101 through the light emitting surface 716a. In an embodiment, the light L2 provided by the light emitting unit 717 passes through the light guide plate 716, the optical film 114 and the light guide plate 112, be reflected back to the light guide plate 716, and then travels to the display panel 101 through the light emitting surface 716a. In an embodiment, the light L3 provided by the light emitting unit 113 enters the light guide plate 112, be concentrated by the microstructures of the light guide plate 112, and travels to the display panel 101 through the optical film 114 and the light guide plate 716. In an embodiment, the light provided by the light emitting unit 113 is converted into collimated light through the light guide plate 112 and the optical film 114.

The display device 70 may further include a control unit electrically connected to the light emitting unit 113 and the light emitting unit 717 (not shown) and a local control unit electrically connected to the light emitting unit 717 (not shown). The control unit and the local control unit will be described below. The light guide plate 112 and the light guide plate 716 mentioned below can be replaced with the light guide plate 412 shown in FIGS. 4-5 and the light guide plate 916 shown in FIG. 10 respectively when describing the control unit and the local control unit.

The control unit can adjust the intensity of the light provided by the light emitting unit 113 and the intensity of the light provided by the light emitting unit 717 respectively. In the display device 70, the microstructures of the light guide plate 112 can concentrate light, the diffuser dots of the light guide plate 716 can scatter light, and thus the viewing angle of the display device 70 can be adjusted by adjusting the relative intensity of the light provided by the light emitting unit 113 and the light provided by the light emitting unit 717 by using the control unit. For example, a portion of the light emitting unit 717 can be arranged to correspond the periphery of the light guide plate 716, the light provided by the portion of the light emitting unit 717 passes through the periphery of the light guide plate 716. The light provided by the light emitting unit 717 may include periphery light (provided by a portion of the light emitting unit 717 that corresponds the periphery of the light guide plate 716) passing through the periphery of the light guide plate 716, and middle light (provided by a portion of the light emitting unit 717 that corresponds the middle of the light guide plate 716) passing through the middle of the light guide plate 716. The local control unit may adjust the intensity of light provided by the portion of the light emitting unit 717 that corresponds the periphery of the light guide plate 716 and the intensity of light provided by the portion of the light emitting unit 717 that corresponds the middle of the light guide plate 716 independently, so as to adjust the intensity of the periphery light, the intensity of the middle light and the relative intensity of the periphery light and the middle light. The diffuser dots of the light guide plate 716 increases the light emitting angle of the periphery light, and thus the viewing angle of the display device 70 can be adjusted by using the local control unit to adjust the intensity of the periphery light, the intensity of the middle light and the relative intensity of the periphery light and the middle light.

Figure 11:
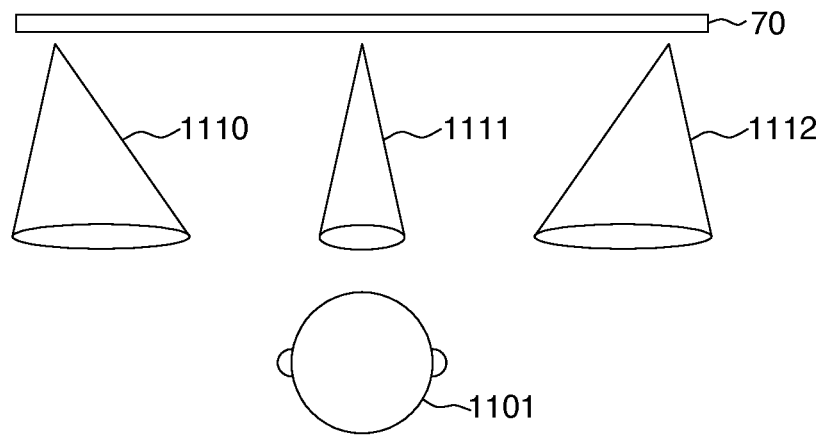
FIG. 11 shows a schematic view of viewing angle of a display device according to an embodiment of the present disclosure.

The viewing angle of the display device 70 in operation will be described as follows with reference to FIGS. 11 to 14. In an embodiment, as shown in FIG. 11, the control unit makes the intensity of the light provided by the light emitting unit 717 smaller than the intensity of the light provided by the light emitting unit 113 (for example, the light emitting unit 717 is turned off and does not provide light), the periphery of the display device 70 provides light distributions 1110 and 1112 to user 1101, and the middle of the display device 70 provides a light distributions 1111 to user 1101. The microstructures of the light guide plate 112 can concentrate light and increase the intensity of light in the periphery, so that the light distributions 1110, 1111 and 1112 provided by the display device 70 are narrow, the viewing angle of the display device 70 decreases and the brightness of the periphery of the display device 70 increases, which can maintain good anti-peeping effects and improve the image quality of the periphery area.

Figure 12:
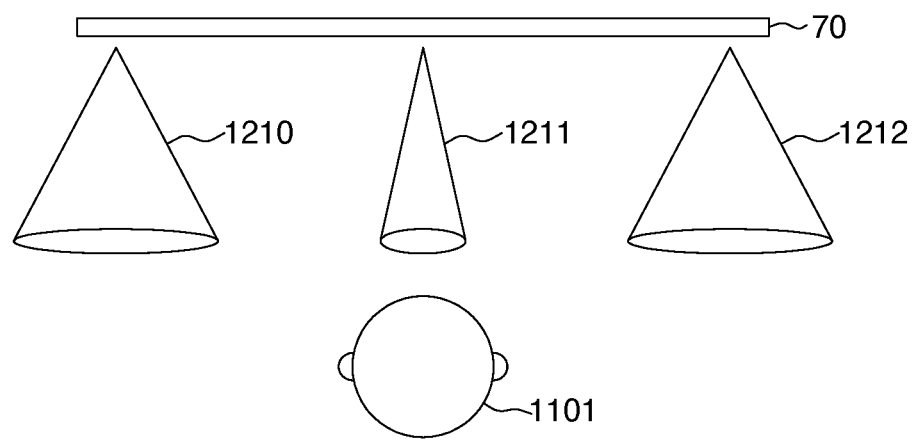
FIG. 12 shows a schematic view of viewing angle of a display device according to an embodiment of the present disclosure.

In an embodiment, as shown in FIG. 12, the light emitting unit 113 and the light emitting unit 717 provide light respectively, the local control unit makes the intensity of the periphery light provided by the light emitting unit 717 equal to the intensity of the middle light provided by the light emitting unit 717, the periphery of the display device 70 provides light distributions 1210 and 1212 to user 1101, and the middle of the display device 70 provides a light distributions 1211 to user 1101. The diffuser dots of the light guide plate 716 can scatter light and the arrangement of the diffuser dots enhance the degree of light scattering of periphery light, and thus the light distributions 1210 and 1212 provide by the periphery of the display device 70 are wider than the light distributions 1211 provided by the middle of the display device 70, which increases the view angle of the display device 70 and increase the brightness of the periphery of the display device 70.

Figure 13:
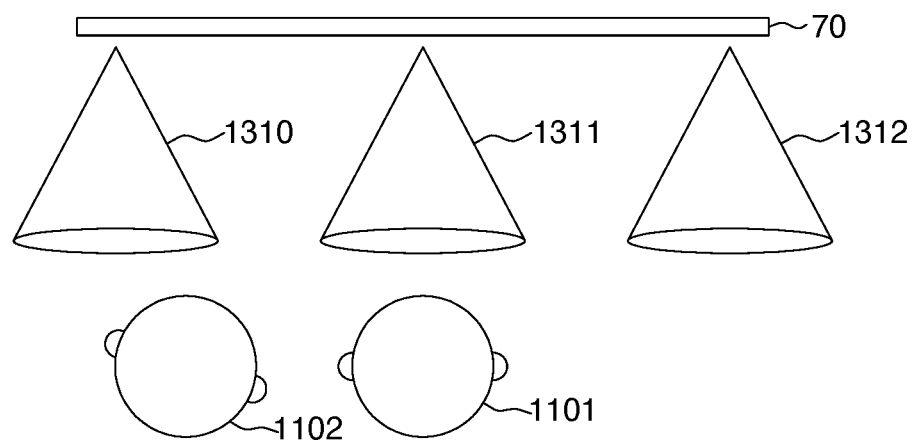
FIG. 13 shows a schematic view of viewing angle of a display device according to an embodiment of the present disclosure.

In an embodiment, as shown in FIG. 13, the light emitting unit 113 and the light emitting unit 717 provide light respectively, the local control unit makes the intensity of the middle light provided by the light emitting unit 717 greater than the intensity of the periphery light provided by the light emitting unit 717, the periphery of the display device 70 provides light distributions 1310 and 1312 to users 1101 and 1102, and the middle of the display device 70 provides a light distributions 1311 to users 1101 and 1102. The degree of light scattering of the light distributions 1311 provided by the middle of the display device 70 increases and the view angle of the display device 70 increases since the intensity of the middle light is greater than the intensity of the periphery light. As such, when multiple users watch the display device, all users (e.g. users 1101 and 1102) can have good viewing experiences.

Figure 14:
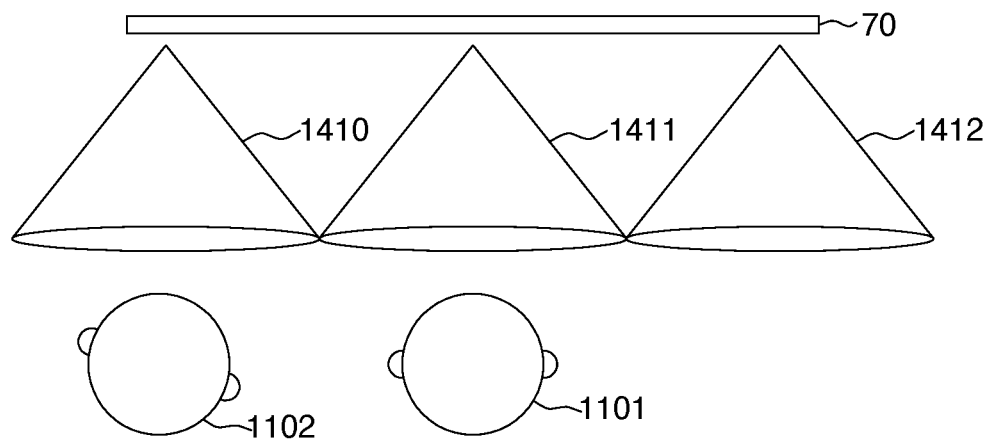
FIG. 14 shows a schematic view of viewing angle of a display device according to an embodiment of the present disclosure.

In an embodiment, as shown in FIG. 14, the light emitting unit 113 and the light emitting unit 717 provide light respectively, the local control unit makes the intensity of the middle light provided by the light emitting unit 717 greater than the intensity of the periphery light provided by the light emitting unit 717, and the intensities of the middle light and periphery light are greater than the intensities of the middle light and periphery light in the embodiment of FIG. 13 respectively. As compared with the embodiment of FIG. 13, the degrees of light scattering of light distributions 1410 and 1412 provide by the periphery of the display device 70 and the degree of light scattering of light distribution 1411 provide by the middle of the display device 70 increase, and the viewing angle of the display device 70 increases. As such, when multiple users watch the display device, all users (e.g. users 1101 and 1102) can have good viewing experiences, and users can watch the display device from a longer distance.

According to above embodiments, the display device of the present disclosure includes a light guide plate including microstructures, and the microstructures guide periphery light traveling to the periphery of the light guide plate to the light emitting surface of the light guide plate. With such configuration, light loss can be reduced effectively and problems of insufficient brightness or uneven brightness in anti-peeping display device can be avoided without affecting the anti-peeping effect. Moreover, the present disclosure provides a display device including two light guide plates, which can adjust the view angle of the display device by adjusting the intensities of light entering two light guide plates and locally adjusting the intensity of light entering the light guide plate. The display device according to the present disclosure can meet different user needs, for example, the viewing angle of the display device can be limited to prevent the display device from peeping, or the viewing angle of the display device can increase to have wide viewing angle. In addition, the display device according to the present disclosure has a peeping-proof display function without the use of anti-peeping filter, which can avoid problems of insufficient brightness and high cost caused by the anti-peeping filter. Since no anti-peeping filter is required in the present disclosure, the present disclosure can be applied to curved display devices without optical interference.

The present disclosure is not limited to the above embodiments and can be adjusted or varied properly according to actual demands. The specification and the structures shown in the drawings are used to describe the concepts of the embodiments, and the scope of the invention is not limited thereto. Moreover, it could be understood that the component elements in the embodiments are not limited to the shape and the disposition shown in the drawings, and can be adjusted according to the demand and/or process steps of actual applications without deviating from the spirit of the invention.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a display panel; and
   a backlight module on the display panel, wherein the backlight module comprises:
   a first light guide plate;
   a second light guide plate between the first light guide plate and the display panel, wherein the second light guide plate comprises diffuser dots;
   an optical film between the first light guide plate and the second light guide plate;
   a first light emitting unit providing first light to the first light guide plate, wherein the first light is converted into collimated light through the first light guide plate and the optical film;
   a second light emitting unit providing second light to the second light guide plate, wherein the second light is scattered by the diffuser dots of the second light guide plate; and
   a control unit electrically connected to the first light emitting unit and the second light emitting unit, wherein the control unit adjusts a viewing angle of the display device by adjusting the relative intensity of the first light provided by the first light emitting unit and the second light provided by the second light emitting unit, wherein the diffuser dots comprises first diffuser dots arranged in periphery of the second light guide plate and second diffuser dots arranged in middle of the second light guide plate, the first diffuser dots have a first pitch, the second diffuser dots have a second pitch, and the first pitch is smaller than the second pitch.

2. The display device according to claim 1, wherein each of the first diffuser dots has a first width, each of the second diffuser dots has a second width, and the first width is equal to the second width.

3. A display device, comprising:
   a display panel; and
   a backlight module on the display panel, wherein the backlight module comprises:
   a light guide plate having a light incident surface, a light emitting surface and a reflection surface, wherein two sides of the light incident surface connect the light emitting surface and the reflection surface respectively, the light emitting surface faces the display panel, the reflection surface comprises a first periphery light guide region, a second periphery light guide region, and a middle light guide region between the first periphery light guide region and the second periphery light guide region, the first periphery light guide region comprises first microstructures, the second periphery light guide region comprises second microstructures different from the first microstructures, the first microstructures have first light guide inclined surfaces inclined towards the second periphery light guide region, the second microstructures have second light guide inclined surfaces inclined towards the first periphery light guide region, the middle light guide region comprises third microstructures and fourth microstructures arranged alternately, the third microstructures are different from the fourth microstructures, each of the third microstructures has a third light guide inclined surfaces inclined towards the second periphery light guide region, and each of the fourth microstructures has a fourth light guide inclined surfaces inclined towards the first periphery light guide region; and a light emitting unit providing light entering the light guide plate from the light incident surface, wherein the first light guide inclined surfaces and the second light guide inclined surfaces guide the light provided by the light emitting unit to the display panel through the light emitting surface.

4. The display device according to claim 3, wherein the middle light guide region comprises fifth microstructures different from the first microstructures, the second microstructures, the third microstructures and the fourth microstructures, and the third microstructures, the fourth microstructures and the fifth microstructures arranged alternately in the middle light guide region.

5. The display device according to claim 3, wherein gradients of the first light guide inclined surfaces of the first microstructures relative to a horizontal surface are different from each other.

6. The display device according to claim 3, wherein the farther the first microstructure is from the light emitting unit, the greater the gradient of the first light guide inclined surfaces of the first microstructure relative to a horizontal surface becomes.

7. The display device according to claim 3, wherein the first light guide inclined surfaces and the second light guide inclined surfaces guide the light provided by the light emitting unit to the middle light guide region.

8. The display device according to claim 3, wherein the backlight module further comprises an optical film between the light guide plate and the display panel, and the optical film comprises a reverse prism.

9. The display device according to claim 8, wherein the light provided by the light emitting unit is converted into collimated light through the optical film.

10. A display device, comprising:
a display panel; and
a backlight module on the display panel, wherein the backlight module comprises:
a first light guide plate;
a second light guide plate between the first light guide plate and the display panel, wherein the second light guide plate comprises diffuser dots;
an optical film between the first light guide plate and the second light guide plate;
a first light emitting unit providing first light to the first light guide plate, wherein the first light is converted into collimated light through the first light guide plate and the optical film;
a second light emitting unit providing second light to the second light guide plate, wherein the second light is scattered by the diffuser dots of the second light guide plate; and
a control unit electrically connected to the first light emitting unit and the second light emitting unit, wherein the control unit adjusts a viewing angle of the display device by adjusting the relative intensity of the first light provided by the first light emitting unit and the second light provided by the second light emitting unit, wherein the diffuser dots comprises first diffuser dots and second diffuser dots, each of the first diffuser dots has a first width, each of the second diffuser dots has a second width, and the first width is greater than the second width.

11. The display device according to claim 10, wherein the control unit makes the intensity of the second light provided by the second light emitting unit smaller than the intensity of the first light provided by the first light emitting unit so as to reduce the viewing angle of the display device.

12. The display device according to claim 10, wherein the backlight module further comprises a local control unit electrically connected to the second light emitting unit, wherein the second light comprises periphery light passing through periphery of the second light guide plate, and middle light passing through middle of the second light guide plate, the local control unit adjusts the viewing angle of the display device by adjusting the relative intensity of the periphery light and the middle light.

13. The display device according to claim 12, wherein the local control unit makes the intensity of the middle light greater than the intensity of the periphery light so as to increase the viewing angle of the display device.

14. The display device according to claim 10, wherein the first diffuser dots are arranged on opposite sides of the second diffuser dots.

15. The display device according to claim 10, wherein the diffuser dots further comprises third diffuser dots between the first diffuser dots and the second diffuser dots, each of the third diffuser dots has a third width, and the third width is greater than the second width and smaller than the first width.

16. The display device according to claim 10, wherein the first diffuser dots have a first pitch, the second diffuser dots have a second pitch, and the second pitch is equal to the first pitch.

17. The display device according to claim 10, wherein the backlight module further comprises a reflective film, the reflective film and the optical film are on opposite sides of the first light guide plate, the second light provided by the second light emitting unit passes through the second light guide plate, the optical film, the first light guide plate and is reflected to the second light guide plate by the reflective film.

18. The display device according to claim 10, wherein the first light guide plate comprises a first periphery light guide region, a second periphery light guide region, and a middle light guide region between the first periphery light guide region and the second periphery light guide region, the first periphery light guide region comprises first microstructures, the second periphery light guide region comprises second microstructures different from the first microstructures, the first microstructures have first light guide inclined surfaces inclined towards the second periphery light guide region, the second microstructures have second light guide inclined surfaces inclined towards the first periphery light guide region.

* * * * *